US011113751B2

(12) United States Patent
Zhang et al.

(10) Patent No.: US 11,113,751 B2
(45) Date of Patent: Sep. 7, 2021

(54) SYSTEMS AND METHODS FOR PREDICTING LOST DEMAND USING MACHINE LEARNING ARCHITECTURES

(71) Applicant: Walmart Apollo, LLC, Bentonville, AR (US)

(72) Inventors: Shengyang Zhang, Santa Clara, CA (US); Mingang Fu, Palo Alto, CA (US); Madhavan Kandhadai Vasantham, Dublin, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 50 days.

(21) Appl. No.: 16/774,407

(22) Filed: Jan. 28, 2020

(65) Prior Publication Data

US 2021/0233153 A1 Jul. 29, 2021

(51) Int. Cl.
*G06Q 30/00* (2012.01)
*G06Q 30/06* (2012.01)
*G06N 20/00* (2019.01)
*G06Q 30/02* (2012.01)
*G06Q 10/08* (2012.01)

(52) U.S. Cl.
CPC ......... *G06Q 30/0635* (2013.01); *G06N 20/00* (2019.01); *G06Q 10/087* (2013.01); *G06Q 30/0201* (2013.01); *G06Q 30/0202* (2013.01)

(58) Field of Classification Search
None
See application file for complete search history.

(56) References Cited

U.S. PATENT DOCUMENTS

| 5,596,493 | A | 1/1997 | Tone et al. |
| 8,484,068 | B2 | 7/2013 | Godwin et al. |
| 9,165,270 | B2 | 10/2015 | Dickinson et al. |
| 2008/0140515 | A1* | 6/2008 | Godwin ............ G06Q 30/0205 705/7.24 |
| 2010/0235310 | A1 | 9/2010 | Gage et al. |
| 2017/0300966 | A1* | 10/2017 | Dereszynski ...... G06Q 30/0254 |

* cited by examiner

*Primary Examiner* — Mila Airapetian
(74) *Attorney, Agent, or Firm* — Bryan Cave Leighton Paisner LLP

(57) ABSTRACT

Systems and methods including one or more processors and one or more non-transitory storage devices storing computing instructions configured to run on the one or more processors and perform acts of: providing, via an electronic platform, access to one or more order placement user interfaces; collecting order placement information associated with the one or more order placement user interfaces; analyzing, by a conversion determination network of a machine learning architecture, the order placement information; generating actual conversion information for client sessions based on the actual availability of the order placement options during the client sessions; generating predicted conversion information for the client sessions based on a full availability of all of the order placement options during the client sessions; and generating lost demand information based, at least in part, on the actual conversion information and the predicted conversion information. Other embodiments are disclosed herein.

20 Claims, 8 Drawing Sheets

FIG. 6

| Today<br>Not Available | Tomorrow<br>Free pickup | Wed, Aug 14<br>Free pickup | Thu, Aug 15<br>Free pickup | Fri, Aug 16<br>Free pickup | Sat, Aug 17<br>Free pickup | Sun, Aug 18<br>Free pickup |
|---|---|---|---|---|---|---|
| ○ 8am - 9am | FREE | | | | | |
| ○ 9am - 10am | FREE | | | | | |
| ○ 10am - 11am | FREE | | | | | |
| ○ 11am - 12pm | FREE | | | | | |
| ○ 12pm - 1pm | FREE | | | | | |
| ○ 1pm - 2pm | FREE | | | | | |
| ○ 2pm - 3pm | FREE | | | | | |
| ○ 3pm - 4pm | FREE | | | | | |
| ○ 4pm - 5pm | FREE | | | | | |
| ○ 5pm - 6pm | FREE | | | | | |
| ○ 6pm - 7pm | FREE | | | | | |
| ○ 7pm - 8pm | FREE | | | | | |

610, 620, 360, 365

800

810— Providing, via an electronic platform, access to one or more order placement user interfaces 820— Collecting order placement information associated with the one or more order placement user interfaces, the order placement information at least indicating (a) actual availability of order placement options during client sessions involving the one or more order placement user interfaces and (b) whether or not the client sessions were converted to actual orders 830— Analyzing, by a conversion determination network of a machine learning architecture, the order placement information 840— Generating, using the conversion determination network of the machine learning architecture, actual conversion information for the client sessions based on the actual availability of the order placement options during the client sessions 850— Generating, using the conversion determination network of the machine learning architecture, predicted conversion information for the client sessions based on a full availability of all of the order placement options during the client sessions 860— Generating lost demand information based, at least in part, on the actual conversion information and the predicted conversion information 870— Executing, by an adjustment component, one or more corrective actions based on the lost demand information

FIG. 8

SYSTEMS AND METHODS FOR
PREDICTING LOST DEMAND USING
MACHINE LEARNING ARCHITECTURES

TECHNICAL FIELD

This disclosure relates generally to systems and methods for predicting lost demand and related information using machine learning architectures and techniques.

BACKGROUND

Electronic platforms enable users to browse, view, purchase, and/or order items corresponding to various products and services. The electronic platforms may provide users with options to place orders for delivery or pick up at a store location. However, in many cases, these options may be unavailable or limited due to large quantities of orders or deliveries being scheduled for a given day or time. For example, due to a large number of orders already being scheduled for a particular time frame on a particular day, users of electronic platforms may be prohibited from placing further orders during that time frame. This result translates to an undersupply of ordering options that cannot satisfy user demand on the electronic platforms.

While the electronic platforms may desire to provide sufficient ordering options to satisfy demand in all scenarios, such options can be technically challenging to provide. One technical problem involves accurately predicting the demand in these undersupply scenarios. Because the actual demand is not known, the electronic platforms may be forced to test demand at various days and times by manually adjusting the supply of given ordering options. However, doing so can be tedious, inefficient, and may result in oversupply of ordering options during testing.

BRIEF DESCRIPTION OF THE DRAWINGS

To facilitate further description of the embodiments, the following drawings are provided in which:

FIG. 6 is an exemplary order placement user interface in a full supply scenario according to certain embodiments;

FIG. 8 illustrates a flowchart for an exemplary method according to certain embodiments.

Figure 1:
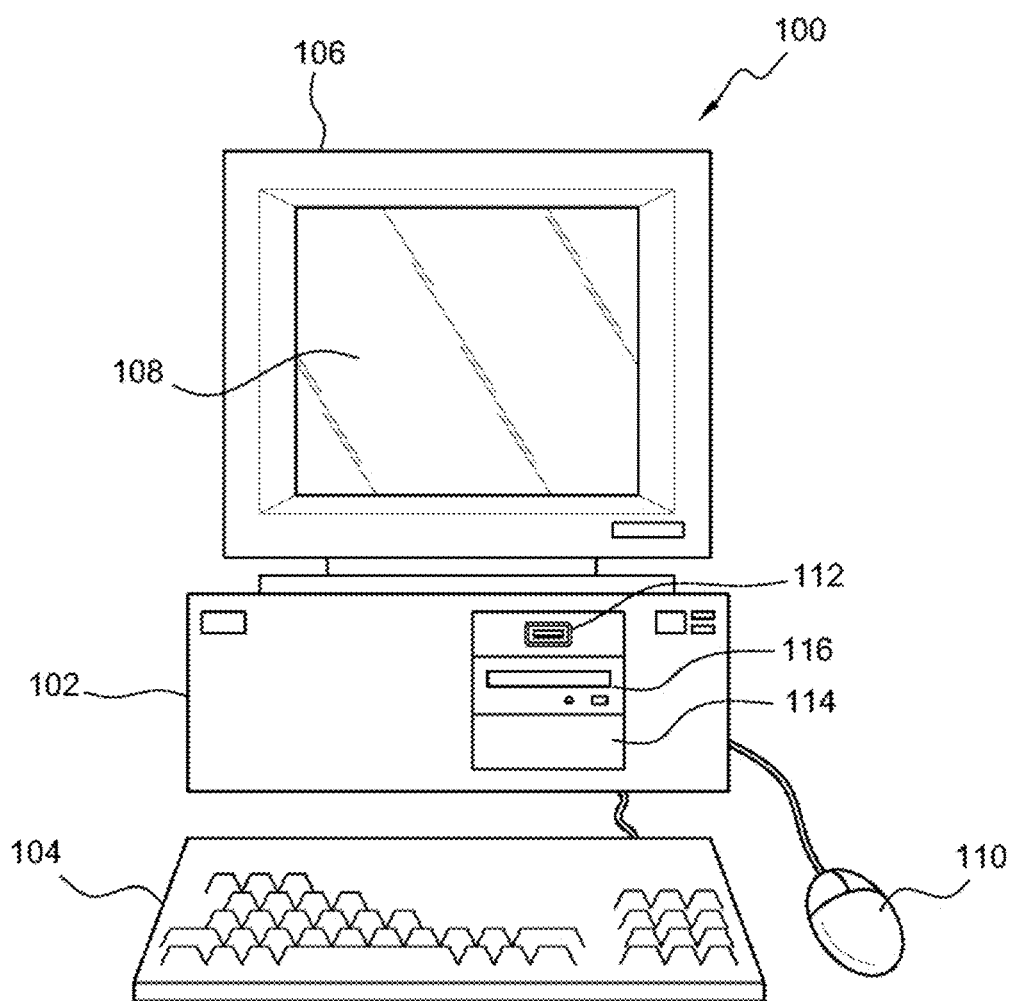
FIG. 1 illustrates a front elevational view of a computer system that is suitable for implementing various embodiments of the systems, architectures, and methods disclosed in FIGS. 3-8.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF
EMBODIMENTS

A number of embodiments can include a system. The system can include one or more processors and one or more non-transitory computer-readable storage devices storing computing instructions. The computing instructions can be configured to run on the one or more processors and perform: providing, via an electronic platform, access to one or more order placement user interfaces; collecting order placement information associated with the one or more order placement user interfaces, the order placement information at least indicating (a) actual availability of order placement options during client sessions involving the one or more order placement user interfaces and (b) whether or not the client sessions were converted to actual orders; analyzing, by a conversion determination network of a machine learning architecture, the order placement information; generating, using the conversion determination network of the machine learning architecture, actual conversion information for the client sessions based on the actual availability of the order placement options during the client sessions; generating, using the conversion determination network of the machine learning architecture, predicted conversion information for the client sessions based on a full availability of all of the order placement options during the client sessions; and generating lost demand information based, at least in part, on the actual conversion information and the predicted conversion information.

Various embodiments include a method. The method can be implemented via execution of computing instructions configured to run at one or more processors and configured to be stored at non-transitory computer-readable media. The method can comprise: providing, via an electronic platform, access to one or more order placement user interfaces; collecting order placement information associated with the one or more order placement user interfaces, the order placement information at least indicating (a) actual availability of order placement options during client sessions involving the one or more order placement user interfaces and (b) whether or not the client sessions were converted to actual orders; analyzing, by a conversion determination network of a machine learning architecture, the order placement information; generating, using the conversion determination network of the machine learning architecture, actual conversion information for the client sessions based on the actual availability of the order placement options during the client sessions; generating, using the conversion determination network of the machine learning architecture, predicted conversion information for the client sessions based on a full availability of all of the order placement options during the client sessions; and generating lost demand information based, at least in part, on the actual conversion information and the predicted conversion information.

Figure 2:
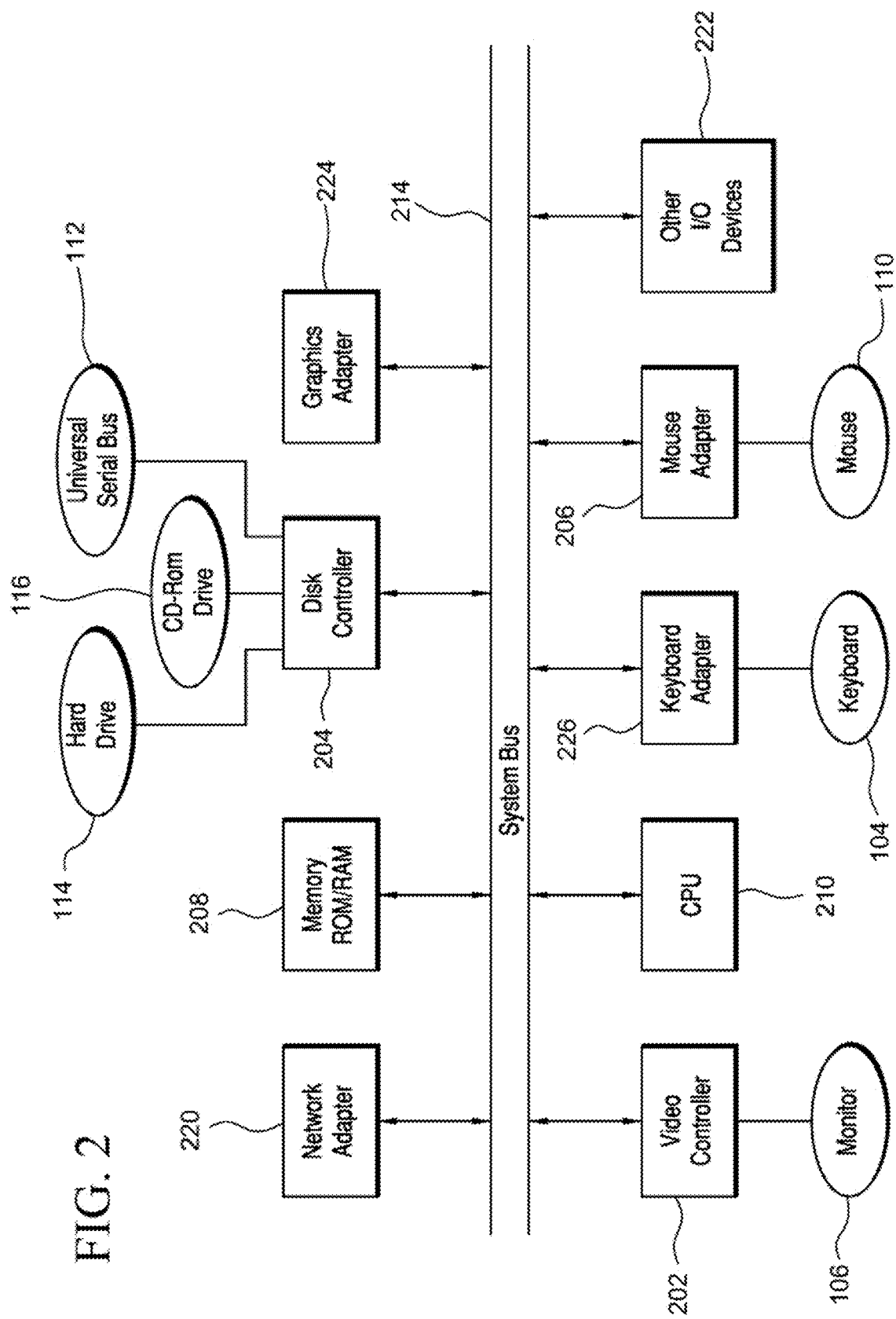
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux®

OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
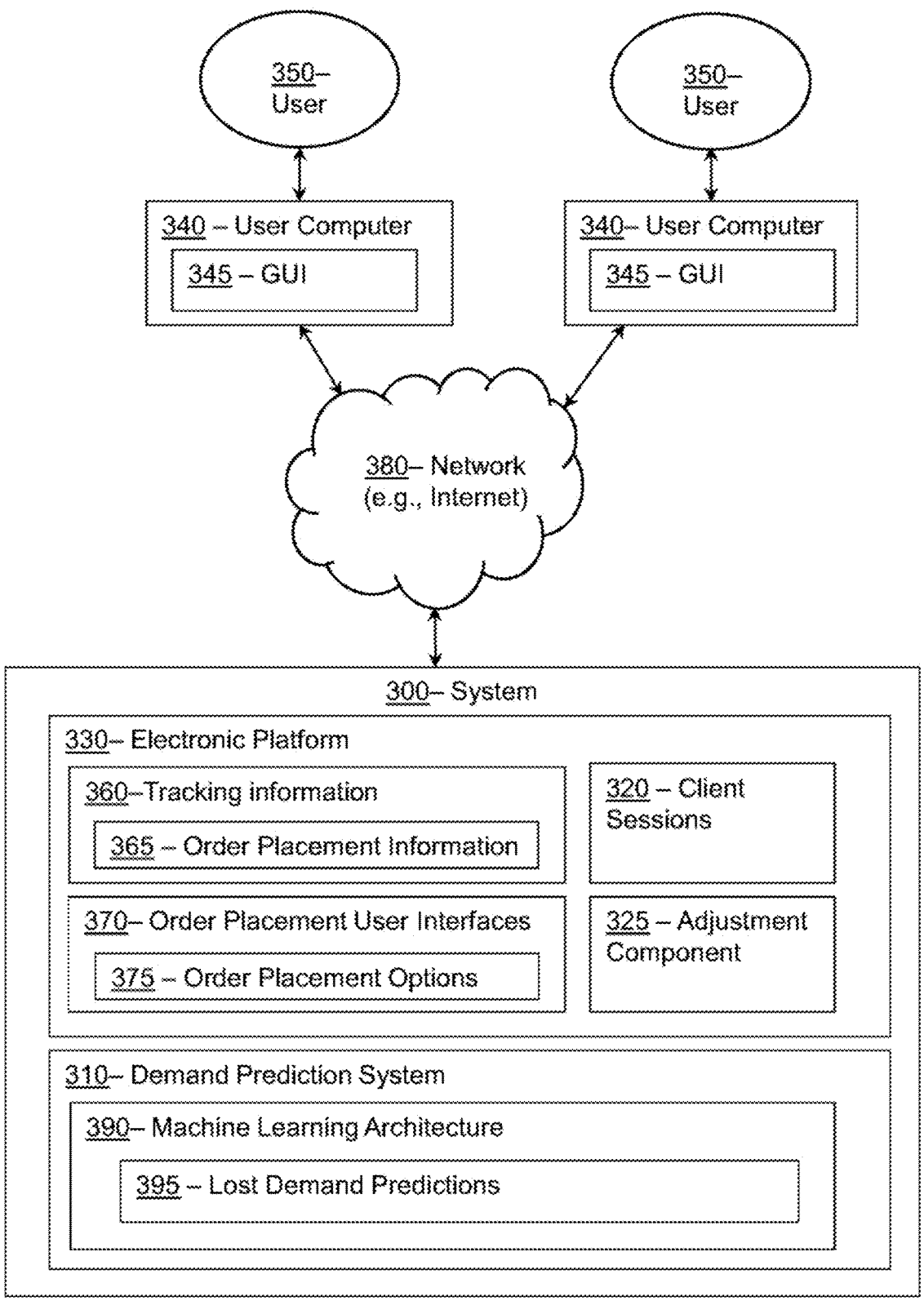
FIG. 3 illustrates a representative block diagram of a system, according to certain embodiments.

Turning ahead in the drawings, FIG. 3 illustrates a block diagram of a system 300 that can be employed for predicting lost demand and adjusting ordering options, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a demand prediction system 310 and an electronic platform 300. Demand prediction system 310 and electronic platform 300 can each be a separate computer system, such as computer system 100 (FIG. 1), as described above, and can each be a single computer, a single server, or a cluster or collection of computers or servers, or a cloud of computers or servers. In another embodiment, a single computer system can host each of the demand prediction system 310 and the electronic platform 330. Additional details regarding the demand prediction system 310 and the electronic platform 330 are described herein.

In many embodiments, system 300 also can comprise user computers 340. In other embodiments, user computers 340 can be external to system 300. User computers 340 can comprise any of the elements described in relation to computer system 100. In some embodiments, user computers 340 can be mobile devices. A mobile device can refer to a portable electronic device (e.g., an electronic device easily conveyable by hand by a person of average size) with the capability to present audio and/or visual data (e.g., text, images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile device, and vice versa. However, a wearable user computer device does not necessarily comprise a mobile device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or a server computer. In the same or different embodiments, the GUIs 345 can comprise a website accessed through network 380 (e.g., the Internet). In some embodiments, the GUIs 345 can comprise an eCommerce website. In the same or different embodiments, the GUI 345 can be displayed as or on a virtual reality (VR) and/or augmented reality (AR) system or display.

In some embodiments, web server can be in data communication through network 380 (e.g., the Internet) with user computers (e.g., 340). In certain embodiments, user computers 340 can be desktop computers, laptop computers, smart phones, tablet devices, and/or other endpoint devices. Web server can host one or more websites. For example, web server can host an eCommerce website that allows users to browse and/or search for products, to add products to an electronic shopping cart, and/or to purchase products, in addition to other suitable activities.

In many embodiments, the demand prediction system 310 and/or the electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) the demand prediction system 310 and/or the electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the demand prediction system 310 and/or the electronic platform 330. In a similar manner, the processing module(s) and the memory storage module(s) can be local and/or remote to each other.

In many embodiments, the demand prediction system 310 and/or the electronic platform 330 can be configured to communicate with one or more user computers 340. In some embodiments, user computers 340 also can be referred to as customer computers. In some embodiments, the demand prediction system 310 and/or the electronic platform 330 can communicate or interface (e.g., interact) with one or more customer computers (such as user computers 340) through a network 380 (e.g., the Internet). Network 380 can be an intranet that is not open to the public. Accordingly, in many embodiments, the demand prediction system 310 and/or the electronic platform 330 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the demand prediction system 310 and/or the electronic platform 330 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, Postgr-eSQL Database, Microsoft SQL Server Database, Oracle Database, SAP (Systems, Applications, & Products) Database, IBM DB2 Database, and/or NoSQL Database.

Meanwhile, communication between the demand prediction system 310 and/or the electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, the electronic platform 330 is configured to provide a website for an online retailer or online shopping site that enables users 350 to browse offerings (e.g., products and/or services), place orders, make purchases, access online accounts, and perform other related activities over the network 380. The electronic platform 330 can include one or more databases that store information associated with the products and/or services.

For each user 350 that accesses (e.g., using user devices 340) the website and/or the electronic platform 330, a client session 320 may be established. As used herein, the term "client session" is intended to be used broadly and may generally relate to any connection, interaction, or communication between a device (e.g., user device 340) operated by a user (e.g., customer) and the electronic platform 330. In some cases, a client session 320 may relate to a web session associated with a user 350 accessing the website provided by the electronic platform 330. During client sessions 320, the electronic platform 330 may monitor and store tracking information 360 associated with the users' interactions with the electronic platform 305.

The tracking information 360 collected by the electronic platform 330 may include any or all data and/or information associated with the users' interactions with the electronic platform 305. For example, the tracking information 360 may indicate web pages that were viewed, products and/or services that were viewed, products and/or services that were placed in a digital shopping cart, products and/or services that were purchased, timestamps associated with each action undertaken, and/or any other related information. The tracking information 360 for the client sessions 320 may be associated with customer identifiers (IDs) which uniquely identify the users 350. For example, the customer ID for a user 350 may be obtained based on a user account associated with the user 350, the Internet Protocol (IP address) of a user device 340 that is being operated by the user, and/or in other ways. The tracking information 360 can be associated with an unknown user and assigned a unique ID if customer IDs are not able to be identified by the electronic platform 330.

While a user is accessing the electronic platform 330, one or more order placement user interfaces 370 may be provided to the users to enable the users to place orders and/or purchases for products and/or services offered by the electronic platform 330. The order placement user interfaces 370 may include interfaces that enable the users 350 to place orders for delivery and/or pick-up (e.g., pick-up at retail locations and/or other locations). In certain embodiments, the order placement user interfaces 370 may include order placement options 375 (e.g., time slots) that enable the users to select dates and times for the orders to be delivered and/or picked-up. For example, after or while a user is adding items to a digital shopping cart, the user may select a hyperlink or option to view an order placement user interface 370 that displays order placement options 375 corresponding to available dates and times for delivering or picking up the items. The user 350 can then select a convenient date and time for the delivery or pick-up. However, in some cases, one or more of the order placement options 365 may be unavailable due to high demand for delivery or pick-up at a particular day and time.

The tracking information 360 collected by the electronic platform 330 may include order placement information 365. The order placement information 365 can include any data or information related to the users' interactions with the order placement user interfaces 370, and/or with the ordering options and settings on the order placement user interfaces 370. For example, the order placement information 365 can indicate if and when users accessed one or more of the order placement user interfaces 370 during a given timeframe (e.g., a week or month), and whether or not an order was placed by the users for delivery and/or pick-up. The order placement information 365 may also indicate the order placement options 375 for delivery and/or pick-up which were available when the user 350 accessed the one or more of the order placement user interfaces 370. The order placement information 365 may further indicate the type of device or application (e.g., web application, iOS application, Android application, etc.) that submitted the order and/or which was used to access the order placement user interfaces 360.

In scenarios in which orders are submitted and scheduled for pick-up, the order placement information 365 can indicate the location (e.g., store or retail location) where the order is scheduled to be retrieved, and the pick-up date and time for retrieving the order. In scenarios, in which orders are submitted and scheduled for delivery, the order placement information 365 can indicate the location where the order is being delivered, and the delivery date and time. The order placement information 365 can include other related information and data as well.

Depending upon user demand, the order placement user interfaces 370 can display options in both full supply scenarios and undersupply scenarios. In full supply scenarios, all dates and times within a particular timeframe (e.g., a week or a month) are available to be selected by the user 350, thus enabling user demand to be fully satisfied. In certain embodiments, demand can be accurately predicted in full supply scenarios by comparing the total number of client sessions 320 that both accessed and placed orders via the order placement user interfaces 370 during the timeframe versus the total number of client sessions 320 that accessed the order placement user interfaces 370 and did not place orders.

On the other hand, in undersupply scenarios, at least one order placement option 375 (e.g., at least one time slot corresponding to a time window on a particular day) is not available for selection. An order placement option 375 may be unavailable because a maximum number of users have already scheduled pick-ups and/or deliveries for the time window corresponding to the order placement option 375. Because the number of orders placed through the electronic platform 330 may decreased as a result of the limited availability of the order placement options 375, it can be advantageous for the electronic platforms 300 to increase the supply of ordering options in these undersupply scenarios (e.g., to increase the number of users able to place orders in timeslots that are not available). However, determining an appropriate amount of supply increase can be very difficult because the actual demand is not known.

The demand prediction system 310 can be configured to perform various functions associated with estimating or predicting demand information on the electronic platform 330 including, but not limited to, estimating or predicting lost demand resulting from the unavailability of order placement options 375 in undersupply scenarios. In certain embodiments, the demand prediction system 310 can generate lost demand predictions 395 which can include, or correspond to, estimates or predictions of demand which have been lost due to unavailability of order placement options 375. For example, given a client session 320 in which at least one order placement option 375 is unavailable and an order was not placed, the demand prediction system 310 can generate a lost demand prediction 395 that predicts or estimates the demand which was not fulfilled as a result of the order placement options 375 being unavailable.

In certain embodiments, the demand prediction system 310 can also generate total lost demand predictions 395 across all client sessions 320 in a given timeframe by aggregating or summing the lost demand predictions 395 across all the client sessions 320, thus reflecting an aggregated lost demand for the entire timeframe. The demand prediction system 310 can generate other variants of lost demand predictions 395 as well. As explained in further detail below, the lost demand predictions 395 generated by the demand prediction system 310 can be utilized by an adjustment component 325 to execute various corrective actions associated with increasing supply of order placement options 365 and/or satisfying user demand.

In certain embodiments, the demand prediction system 310 includes a machine learning architecture 390 that assists with generating the lost demand predictions 395. The configuration of the machine learning architecture 390 can vary. In certain embodiments, the machine learning architecture 390 can include one or more machine learning algorithms and/or one or more neural networks. For example, in certain embodiments, the machine learning architecture 390 can be implemented, at least in part, with a version of XGBoost (eXtreme Gradient Boosting) or similar machine learning framework. The one or more machine learning algorithms and/or one or more neural networks can be configured to learn functions for predicting conversion probabilities for various supply scenarios involving the offering options provided by the electronic platform 330, which in turn can be used to derive the lost demand predictions 395. The one or more machine learning algorithms and/or one or more neural networks can be trained to learn these functions using any supervised, semi-supervised, or unsupervised learning technique.

In certain embodiments, the machine learning architecture 390 comprises one or more programmed learning algorithms that receive input data relating to users' interactions with order placement user interfaces 370 (e.g., including the order placement information 365 and other information described below) during client sessions 320, and analyze the input data to predict output values corresponding to conversion probabilities for the client sessions 320. The conversion probabilities can then be utilized to generate the lost demand predictions 365. Details relating to exemplary machine learning architecture 390 are described in further detail below with reference to FIGS. 4-5.

Regardless of how the lost demand predictions 365 are derived, an adjustment component 325 may receive the lost demand predictions 365 and utilize the lost demand predictions 365 to perform various functions associated with fulfilling demand for order placement options 375 on the electronic platform 330. In certain embodiments, the adjustment component 325 can increase the number of orders which may be placed via the order placement options 375 (e.g., for particular time windows on particular days) based on the lost demand predictions 365. The adjustment component 325 can further send notifications or alerts to individuals to notify them of detected undersupply scenarios and/or to provide recommendations for increasing supply in those undersupply scenarios. The adjustment component 325 can further communicate with a labor planning system (or individuals associated with a labor planning system) to increase or adjust the number of workers who are able to assist with fulfilling delivery and/or pick-up orders in timeframes associated with the undersupply scenarios. The adjustment component 325 can be configured to perform other related corrective functions as well.

In certain embodiments, the adjustment component 325 can be configured to perform some or all the above-identified functions automatically without assistance of a human. For example, the tracking information 360 (including the order placement information 365) can be actively monitored by the demand prediction system 310, and the adjustment component 325 can automatically execute the above-identified functions based on the lost demand predictions 395 that are derived from the tracking information 360. Alternatively, or additionally, the adjustment component 325 can perform some or all the above-identified functions with the assistance of a human. For example, a human can access interfaces (e.g., GUIs 345) accessible via the adjustment component 325 to view information related to undersupply scenarios and lost demand predictions 395, and then can make selections for executing some or all of these functions.

Figure 4:
FIG. 4 illustrates a representative block diagram of a portion of the system of FIG. 3 according to certain embodiments.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing a demand prediction system 310 and an electronic platform 330. The one or more processing modules 402 are configured to execute instructions associated with these components. Exemplary configurations for each of these components are described in further detail below.

The electronic platform 330 can provide various fulfillment options 430 to users accessing the electronic platform 330. The fulfillment options 430 can include delivery options 431 and pick-up options 432. The delivery options 431 enable users to place or schedule orders 415 for delivery to locations (e.g., residences, buildings, etc.) desired by the users. The pick-up options 432 enable users to place or schedule orders 415 for retrieval at various locations (e.g., store locations and/or other locations associated with a provider of the electronic platform 330). The orders 415 that are scheduled or placed by the users can vary greatly, and may generally include deliveries and/or pick-ups for any type of product and/or service that is capable of being offered by an electronic platform 330.

The electronic platform 330 can further provide order user placement interfaces 360 that enable the users to schedule or place the orders 415. The order placement user interfaces 360 can include GUIs (e.g., GUIs 345 in FIG. 3) that enable users to schedule both delivery options 431 and pick-up options 432. The order placement user interfaces 360 corresponding to the delivery options 431 may include one or more order placement options 365 corresponding to available dates and times for delivery of the orders 415. The order placement user interfaces 360 corresponding to the pick-up options 432 may include one or more order placement options 365 corresponding to available dates and times for pick-up of the orders 415.

As explained above, the order placement options 365 (or the corresponding order placement user interfaces 360 that include order placement options 365) may be displayed in full supply scenarios 421 or undersupply scenarios 422. In a full supply scenario 422, all order placement options 365 are available for selection by users accessing the electronic platform 330. On the other hand, in an undersupply scenario 422, one or more of the order placement options 365 are unavailable for selection due to higher user demand (e.g., due to the maximum number of orders 415 being scheduled in a particular timeframe for delivery and/or pick-up).

Figure 7:
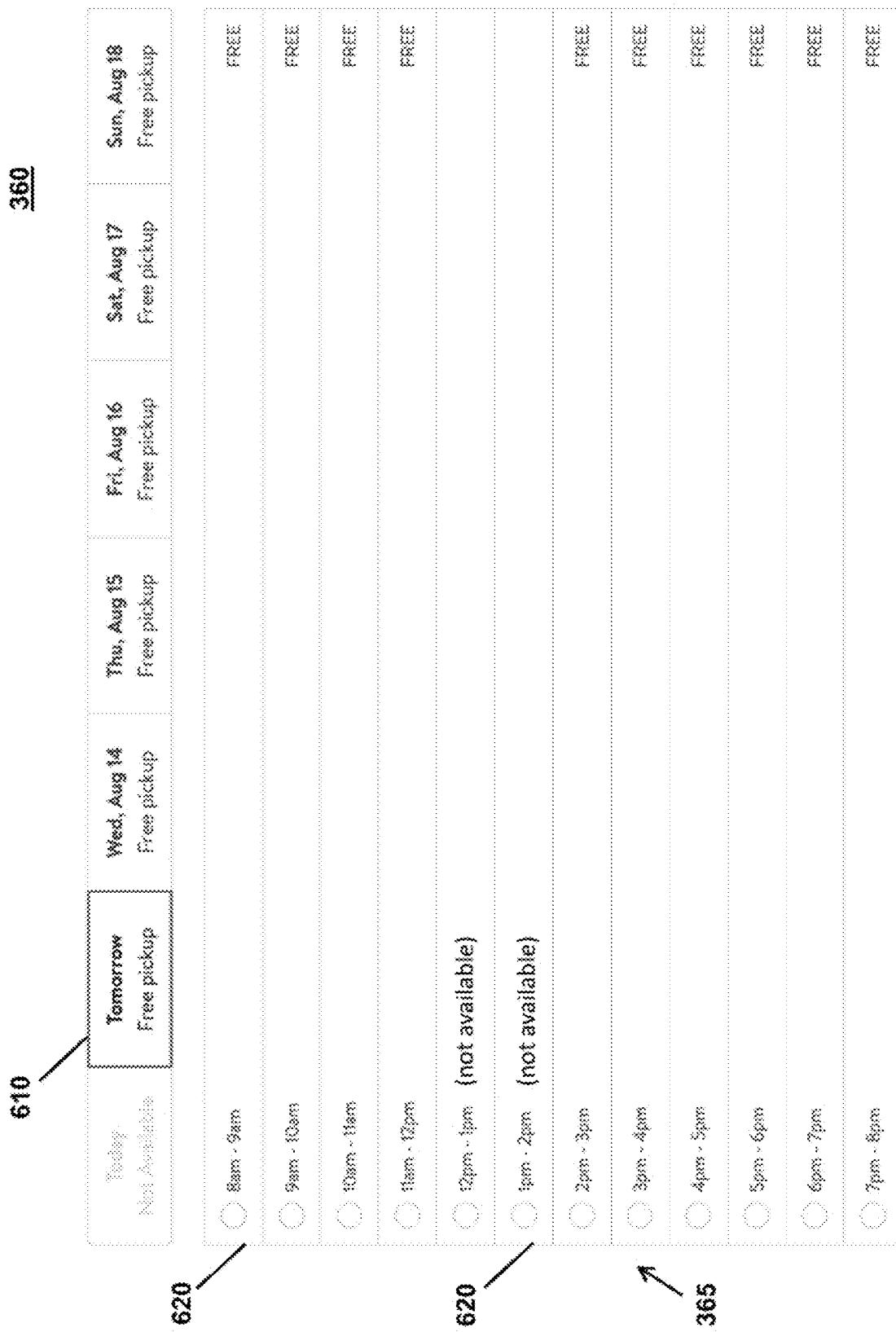
FIG. 7 is an exemplary order placement user interface in an undersupply scenario according to certain embodiments.

FIGS. 6 and 7 disclose exemplary order placement user interfaces 360 that can be provided by the electronic platform 300 (FIGS. 3-4) and displayed on user devices 340 (FIG. 3) for viewing by users 350 (FIG. 3). Both interfaces display order placement options 365 for scheduling a pick-up of an order 415 (FIG. 4). For example, the order placement options 365 include a menu 610 that provides a listing of days in a predetermined timeframe (which, in this example, is a week) and corresponding listing of time slots 620 for each of the days. To schedule a pick-up, the user may select a pick-up date from the menu 610, as well an available time slot 620 for the selected pick-up date. The order placement user interface 360 illustrated in FIG. 6 is displayed in a full supply scenario 421 (FIG. 4) in which all time slots 620 are available for selection by the user. The order placement user interface 360 illustrated in FIG. 7 is displayed in an undersupply scenario 422 (FIG. 4) in which two of the time slots 620 are unavailable for selection by the user.

It should be noted that similar interfaces, as shown in FIGS. 6-7, can be displayed in connection with scheduling deliveries. For example, in response to a user selecting a delivery option 431 (FIG. 4), an order placement user interface 360 may be displayed with a similar menu 610 comprising available delivery dates and a listing of time slots 620 for scheduling a delivery.

Returning to FIG. 4, the unavailability of the order placement options 365 in undersupply scenarios 422 often results in a decrease in the number of orders 415 being placed via the electronic platform 330 which, in turn, results in a decrease in revenue for the electronic platform 330. In addition, the unavailability of order placement options 365 can have a negative effect on customer experiences and may result in customers placing orders for products and/or services from sources other than the electronic platform 330.

To overcome the aforementioned problems and/or other problems, the demand prediction system 310 can generate lost demand predictions 395, which can be used to prevent and/or mitigate occurrences of undersupply scenarios 422. The lost demand predictions 395 can include, inter alia, estimates or predictions which indicate user demand that was lost due to the unavailability of the order placement options 365. The adjustment component 325 can then utilize the lost demand predictions 395 to prevent and/or mitigate occurrences of undersupply scenarios 422 (e.g., by enabling additional orders 415 to be placed on particular days and/or in particular time slots, alerting individuals of undersupply scenarios 422 and corresponding lost demand predictions 395, increasing labor resources, assigning additional workers to handle orders 415 that are placed on particular days and/or in particular time slots, and/or in other ways).

The machine learning architecture 390 included in the demand prediction system 310 can be configured to execute various functions to determine lost demand predictions 395 based, at least in part, on the order placement information 365 collected during the client sessions 320. For example, the machine learning architecture 390 can include a conversion determination network 440 that generates conversion information 450 which can be used to derive the lost demand predictions 395. In certain embodiments, the conversion determination network 440 can be implemented, at least in part, using the XGBoost (eXtreme Gradient Boosting) model, or similar type of machine learning model. In such implementations, the conversion determination network 440 can include a supervised learning algorithm based on a decision-tree model that uses a gradient boosting framework.

The learning algorithm of the conversion determination network 440 can be trained, at least in part, using the tracking information 360 (including the order placement information 365) to learn a function for generating the conversion information 450. Once trained, the learning algorithm of the conversion determination network 440 can receive a set of input parameters related to one or more client sessions 320 and can map the input parameters to an outputs that represent (or which can be used to derive) conversion probabilities for finalizing orders 415 corresponding to the client sessions 320.

In certain embodiments, the input parameters provided to the conversion determination network 440 include various data associated with client sessions 320 that accessed one or more order placement user interfaces 360. The client sessions 320 that accessed the order placement user interfaces 360 can be used to generate the conversion information 360 (e.g., conversion information indicating whether or not orders 415 were placed after the order placement user interfaces 360 were accessed).

Various pre-processing operations can be performed on the input parameters before the input parameters are provided to, and analyzed by, the conversion determination network 440. The pre-processing operations can include removing or deleting duplicate client sessions 320 for users 350 who accessed order placement user interfaces 360 multiple times in a given timeframe. For example, if a user accessed an order placement user interface several times within a given timeframe and did not place an order during that timeframe, the input parameters may only include information corresponding to the first client session and the information corresponding to any subsequent client sessions may be deleted. This can exclude the information corresponding from the subsequent client sessions from being analyzed by the conversion determination network 440. Similarly, if a user accessed an order placement user interface several times within a given timeframe and did place an order during the timeframe, the input parameters may only include information corresponding to the client session 320 that placed the order 415 and the information corresponding to any other client sessions 320 that occurred during the timeframe may be deleted or removed from consideration. Again, this can exclude the information corresponding to the other client sessions from being analyzed by the conversion determination network 440. Other types of pre-processing operations can include removing client sessions 320 corresponding to outliers, reformatting data, and/or other similar operations.

In certain embodiments, for each client session 320 that is provided to the conversion information 450 for analysis, the conversion information 450 generated by the conversion determination network 440 can be used to predict or estimate a conversion probability which represents a likelihood that the order 415 would have been placed (e.g., submitted and confirmed via the order placement user interfaces 360) in view of the order placement options 365 that were available and/or unavailable during the client session 320. The conversion information 450 generated for each client session 320 may include both actual conversion information 470 and predicted conversion information 480.

The actual conversion information 470 can include a conversion probability 475 indicating the probability that the client session 320 would be converted to an order 415 in view of the actual order placement options 365 that were available during the client session 320. The predicted conversion information 480 can include a conversion probability 476 indicating the probability that the client session 320 would be converted to an order 415 in a full supply scenario 421 in which all order placement options 365 were available during the client session 320. Thus, for client sessions 320 in a given timeframe, the predicted conversion information 480 can be used to predict or estimate conversion probabilities 476 for hypothetical scenarios involving full availability of all order placement options 365, despite the fact that some of the order placement options 365 may have been unavailable during the actual client sessions 320.

The lost demand prediction 395 for a given client session 320 can be derived by comparing the conversion probability 475 associated with the actual conversion information 470 with the conversion probability 476 associated with the predicted conversion information 480. For example, in certain embodiments, the lost demand prediction 395 can be generated by subtracting the conversion probability 475 associated with the actual conversion information 470 from the conversion probability 476 associated with the predicted conversion information 480.

The conversion determination network 440 can also generate a lost demand prediction 395 indicating the total loss demand across all client sessions 320 for a given timeframe. This can be derived, at least in part, by summing the loss demand predictions 395 corresponding to each of the client sessions 320 that occurred during the time frame. Alternatively, or additionally, this can be derived by summing the conversion probabilities 475 associated with the actual conversion information 470 across all client sessions 320 that occurred in the timeframe, summing the conversion probabilities 476 associated with the predicted conversion information 480 across all client sessions 320 that occurred in the timeframe, and subtracting the summed conversion probabilities 475 associated with the actual conversion information 470 from the summed conversion probabilities 476 associated with the predicted conversion information 480.

Figure 5:
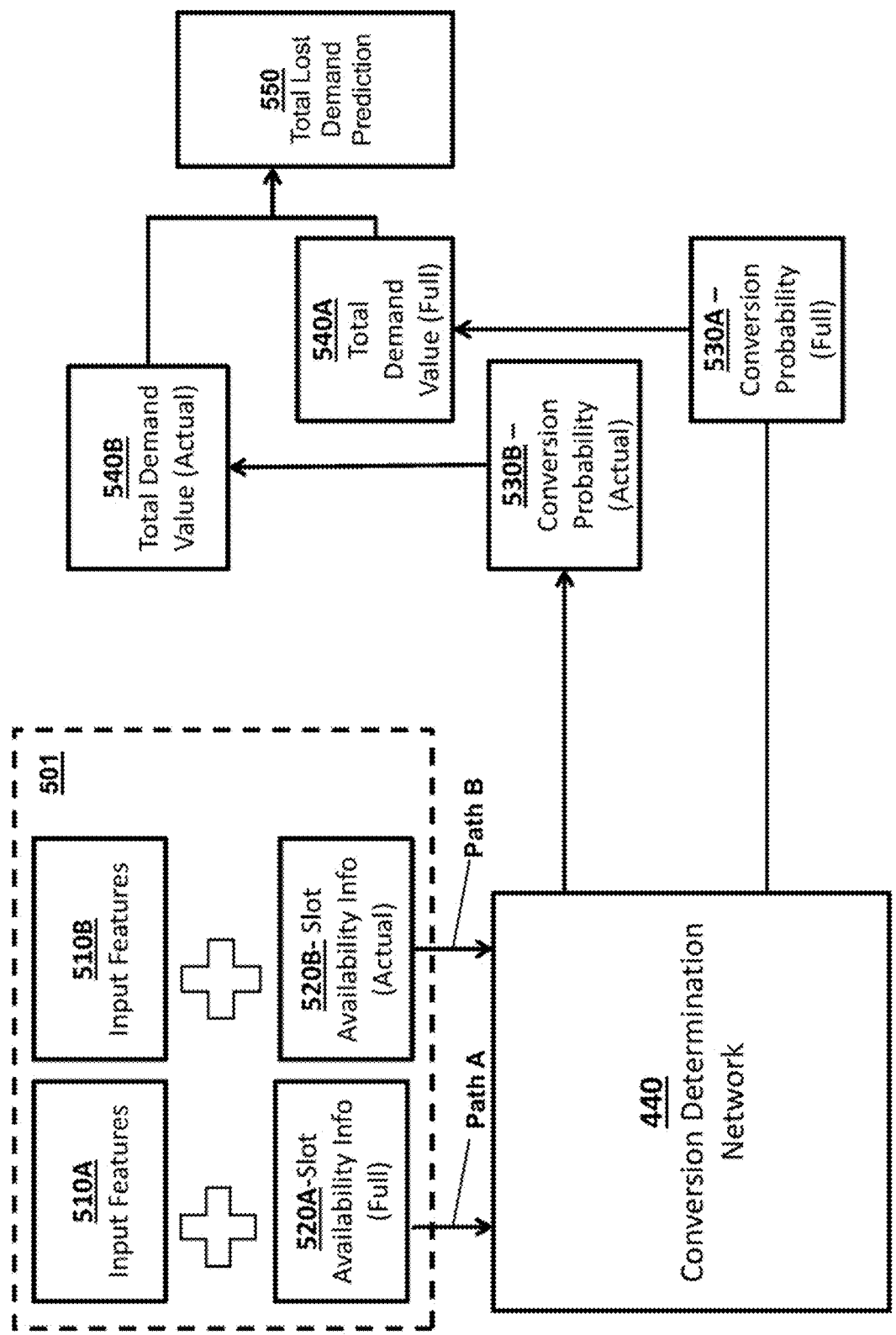
FIG. 5 is a flow diagram illustrating an exemplary framework for generating lost demand predictions according to certain embodiments.

FIG. 5 is a flow diagram illustrating an exemplary framework for generating lost demand predictions according to certain embodiments. This framework may be utilized to generate lost demand predictions which indicate total lost demand over particular timeframe (e.g., week, month, year, etc.).

Two separate paths, Path A and Path B, are used to generate a total lost demand prediction 550 for a given timeframe. Path A is used to derive predicted conversion information associated with estimating conversion probabilities in full supply scenarios for client sessions occurring within the timeframe. Path B is used to derive actual conversion information associated with estimating conversion probabilities based on the actual supply scenarios that were present during the client sessions occurring within the timeframe.

Input parameters 501 are provided to the conversion determination network 440. As mentioned above, various pre-processing operations may be performed on the input parameters 501 before they are provided to the conversion determination network 440. The input parameters 501 include input features 510A, 510B and slot availability information 520A, 520B. At least a portion of the input parameters 501 can include data and/or information associated with the tracking information 360 (FIGS. 3-4), order placement information 365 (FIGS. 3-4), and other information.

The same input features 510A, 510B are provided to the conversion determination network 440 in both Path A and Path B. The input features 510A, 510B can include any or all of the following categorical features:
1) Store Identifier: an ID indicating the specific store that is responsible for fulfilling the delivery or pick-up order corresponding to the client session (e.g., in the case that the provider of the electronic platform comprises multiple store locations);
2) Order Date: if the order was scheduled, the date of the schedule delivery or pick-up;
3) Time Features: identifies time-related features corresponding to a selected time slot (e.g., such as features indicating the day, month, hour, year, start time, week of the year, and/or weekday associated with the selected time slot);
4) Device Type: indicates the type of device or application (e.g., (e.g., web application, iOS application, Android application, etc.) that accessed an order placement user interface and/or that was used in the client session;
5) Historical Conversion Rate: the conversion rate for the user or customer based on stored transaction data associated with the user or customer; and
6) Historical Conversion Number: the number of times the user engaged in a client session and scheduled an order.

The manner in which these categorical input features are provided to the conversion determination network 440 may vary depending upon the configuration of the conversion determination network 440. In certain embodiments, some or all of these categorical features may be input to the conversion determination network 440 in their raw data form. Alternatively, or additionally, one more vectors and/or embeddings may be derived from this information for input to the conversion determination network 440.

For each client session, the slot availability information 520A, 520B indicates an availability of the time slots and/or order placement options during the client session. In Path A, the time slot availability information 520A indicates that all time slots and/or order placement options are available because this path is used to make predictions based on full availability scenarios. In Path B, the time slot availability information 520B indicates the time slots and/or order placement options that were actually available during the client session. If one or more of the time slots and/or order placement options are not available in Path B, the slot availability information 520B can also indicate how long the time slots and/or order placement options have not been available (e.g., a duration or time since they were available). The slot availability information 520A, 520B in both Path A and Path B may also include information that indicates the historical conversion rate of each time slot and/or order placement option.

In response to receiving the input parameters 501, the conversion determination network 440 analyzes the input parameters 501 and uses a trained learning algorithm to map the input parameters 501 to output information that can be used to derive actual conversion information (e.g., conversion probability 530B) and predicted conversion information (e.g., conversion probability 530A). Conversion probability 530A can represent a probability that the client session would have been converted to an order in a full supply scenario in which all time slots and/or order placement options were available. Conversion probability 530B can represent a probability that the client session would have been converted to an order based on the actual availabilities of the time slots and/or order placement options during the client session. In certain embodiments, the output of the conversion determination network 440 can be normalized to scale from 0 to 1 to represent the conversion probabilities 530A, 530B as real numbers.

The conversion probabilities 530A, 530B can be generated for each client session included within the timeframe. After the conversion probabilities 530A, 530B are generated for each client session, they can be summed to derive two separate total demand values 540A, 540B. The total demand value 540A represents the predicted total demand across all client sessions in full supply scenarios. The total demand value 540B represents the actual total demand across all client sessions based on the actual supply scenarios (e.g., which may include undersupply scenarios for one or more of the client sessions). A total lost demand prediction can be derived by subtracting the total demand value 540B representing the actual total demand from the total demand value 540A representing the predicted total demand.

FIG. 8 illustrates a flow chart for an exemplary method 800, according to certain embodiments. Method 800 is merely exemplary and is not limited to the embodiments presented herein. Method 800 can be employed in many different embodiments or examples not specifically depicted or described herein. In some embodiments, the activities of method 800 can be performed in the order presented. In other embodiments, the activities of method 800 can be performed in any suitable order. In still other embodiments, one or more of the activities of method 800 can be combined or skipped. In many embodiments, system 300 (FIGS. 3-4), demand prediction system 310 (FIGS. 3-4), and electronic platform 330 (FIGS. 3-4) can be suitable to perform method 800 and/or one or more of the activities of method 800. In these or other embodiments, one or more of the activities of method 800 can be implemented as one or more computer instructions configured to run at one or more processing modules and configured to be stored at one or more non-transitory memory storage modules. Such non-transitory memory storage modules can be part of a computer system such as system 300 (FIGS. 3-4), demand prediction system 310 (FIGS. 3-4), and electronic platform 330 (FIGS. 3-4). The processing module(s) can be similar or identical to any of the processing module(s) described above.

Method 800 can include an activity 810 of providing, via an electronic platform, access to one or more order placement user interfaces.

Method 800 can further include an activity 820 of collecting order placement information associated with the one or more order placement user interfaces, the order placement information at least indicating (a) actual availability of order placement options during client sessions involving the one or more order placement user interfaces and (b) whether or not the client sessions were converted to actual orders.

Method 800 can further include an activity 830 of analyzing, by a conversion determination network of a machine learning architecture, the order placement information.

Method 800 can further include an activity 840 of generating, using the conversion determination network of the machine learning architecture, actual conversion information for the client sessions based on the actual availability of the order placement options during the client sessions.

Method 800 can further include an activity 850 of generating, using the conversion determination network of the machine learning architecture, predicted conversion information for the client sessions based on a full availability of all of the order placement options during the client sessions.

Method 800 can further include an activity 860 of generating lost demand information based, at least in part, on the actual conversion information and the predicted conversion information. The lost demand information can include any of the lost demand predictions described in this disclosure.

Method 800 can further include an activity 870 of executing, by an adjustment component, one or more corrective actions based on the lost demand information.

As evidenced by the disclosure herein, the techniques set forth in this disclosure are rooted in computer technologies that overcome existing problems in known recommendation systems, specifically problems dealing with predicting lost demand in scenarios which the lost demand is unknown. The techniques described in this disclosure provide a technical solution (e.g., one that utilizes various AI-based neural networking and/or machine learning techniques) for overcoming the limitations associated with known techniques. For example, the prediction techniques described herein take advantage of novel AI and machine learning techniques to learn functions for predicting lost demand and/or conversion probabilities that can be used to derive predictions for lost demand. This technology-based solution marks an improvement over existing capabilities and functionalities related to computer systems by improving the accuracy and quality of the predictions, and doing so in an efficient manner that enables predictions to be made based on functions learned from historical tracking information.

In a number of embodiments, the techniques described herein can advantageously provide an improvement in user experience by eliminating, or at least mitigation, undersupply scenarios on electronic platforms. In various embodiments, the techniques described herein can dynamically execute corrective actions in real time, as described in further detail above. This, in turn, can provide auto-mated and real-time adjustment of supply settings on the electronic platform.

In many embodiments, the techniques described herein can be used continuously at a scale that cannot be reasonably performed using manual techniques or the human mind. For example, the data analyzed by the machine learning architectures described herein can be too large to be analyzed using manual techniques.

Furthermore, in a number of embodiments, the techniques described herein can solve a technical problem that arises only within the realm of computer networks, because machine learning networks do not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 5 and 8 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable storage devices storing computing instructions configured to run on the one or more processors and perform:
providing, via an electronic platform, access to one or more order placement user interfaces;
collecting order placement information associated with the one or more order placement user interfaces, the order placement information at least indicating (a) actual availability of order placement options during client sessions involving the one or more order placement user interfaces and (b) whether or not the client sessions were converted to actual orders;
analyzing, by a conversion determination network of a machine learning architecture, the order placement information;
generating, using the conversion determination network of the machine learning architecture, actual conversion information for the client sessions based on the actual availability of the order placement options during the client sessions;
generating, using the conversion determination network of the machine learning architecture, predicted conversion information for the client sessions based on a full availability of all of the order placement options during the client sessions; and
generating lost demand information based, at least in part, on the actual conversion information and the predicted conversion information.

2. The system of claim 1, wherein:
the actual conversion information comprises a conversion probability for each of the client sessions based on the actual availability of the order placement options during the client sessions; and
the predicted conversion information comprises a predicted conversion probability for each of the client sessions in hypothetical scenarios in which there is full availability of all of the order placement options during the client sessions.

3. The system of claim 2, wherein generating the lost demand information comprises:
aggregating the conversion probabilities to produce a total conversion probability value;
aggregating the predicted conversion probabilities to produce a total predicted conversion probability value; and
generating the lost demand information by determining a difference between the total conversion probability value and the total predicted conversion probability value.

4. The system of claim 1, wherein the computing instructions are configured to run on the one or more processors and further perform:
adjusting settings associated with the order placement options based on the lost demand information.

5. The system of claim 4, wherein adjusting the settings associated with the order placement options at least includes increasing availability of the order placement options in undersupply scenarios.

6. The system of claim 4, wherein adjusting the settings associated with the order placement options at least includes increasing labor resources.

7. The system of claim 1, wherein the computing instructions are configured to run on the one or more processors and further perform:
pre-processing the order placement information to consolidate information relating to the client sessions.

8. The system of claim 7, wherein consolidating the information relating to the client sessions includes:
identifying users that engaged in multiple client sessions involving the one or more order placement user interfaces within a pre-determined time period, wherein the client sessions comprise the multiple client sessions;
selecting an initial client session from the multiple client sessions to be included in the order placement information; and
deleting any other client sessions included in the multiple client sessions before analyzing the order placement information such that analyzing the order placement information excludes analyzing information relating to the other client sessions, and such that the actual conversion information excludes information relating to the other client sessions, and such that the predicted conversion information excludes information relating to the other client sessions.

9. The system of claim 1, wherein the order placement options correspond to at least one of: delivery options or pick-up options.

10. The system of claim 9, wherein generating the lost demand information includes at least of one:
generating the lost demand information corresponding to the delivery options;
generating the lost demand information corresponding to the pick-up options; or
generating the lost demand information corresponding to both the delivery options and the pick-up options.

11. A method implemented via execution of computing instructions configured to run at one or more processors and configured to be stored at non-transitory computer-readable media, the method comprising:
providing, via an electronic platform, access to one or more order placement user interfaces;
collecting order placement information associated with the one or more order placement user interfaces, the order placement information at least indicating (a) actual availability of order placement options during client sessions involving the one or more order placement user interfaces and (b) whether or not the client sessions were converted to actual orders;
analyzing, by a conversion determination network of a machine learning architecture, the order placement information;
generating, using the conversion determination network of the machine learning architecture, actual conversion information for the client sessions based on the actual availability of the order placement options during the client sessions;
generating, using the conversion determination network of the machine learning architecture, predicted conversion information for the client sessions based on a full availability of all of the order placement options during the client sessions; and
generating lost demand information based, at least in part, on the actual conversion information and the predicted conversion information.

12. The method of claim 11, wherein:
the actual conversion information comprises a conversion probability for each of the client sessions based on the actual availability of the order placement options during the client sessions; and
the predicted conversion information comprises a predicted conversion probability for each of the client sessions in hypothetical scenarios in which there is full availability of all of the order placement options during the client sessions.

13. The method of claim 12, wherein generating the lost demand information comprises:
aggregating the conversion probabilities to produce a total conversion probability value;
aggregating the predicted conversion probabilities to produce a total predicted conversion probability value; and
generating the lost demand information by determining a difference between the total conversion probability value and the total predicted conversion probability value.

14. The method of claim 11 further comprising:
adjusting settings associated with the order placement options based on the lost demand information.

15. The method of claim 14, wherein adjusting the settings associated with the order placement options at least includes increasing availability of the order placement options in undersupply scenarios.

16. The method of claim 14 further comprising:
adjusting settings associated with labor resources based on the lost demand information.

17. The method of claim 11 further comprising:
pre-processing the order placement information to consolidate information relating to the client sessions.

18. The method of claim 17, wherein consolidating the information relating to the client sessions includes:
identifying users that engaged in multiple client sessions involving the one or more order placement user interfaces within a pre-determined time period, wherein the client sessions comprise the multiple client sessions;
selecting an initial client session from the multiple client sessions to be included in the order placement information; and
deleting any other client sessions included in the multiple client sessions before analyzing the order placement information such that analyzing the order placement information excludes analyzing information relating to the other client sessions, and such that the actual conversion information excludes information relating to the other client sessions, and such that the predicted conversion information excludes information relating to the other client sessions.

19. The method of claim 11, wherein the order placement options correspond to at least one of: delivery options or pick-up options.

20. The method of claim 19, wherein generating the lost demand information includes at least of one:
generating the lost demand information corresponding to the delivery options;
generating the lost demand information corresponding to the pick-up options; or
generating the lost demand information corresponding to both the delivery options and the pick-up options.

* * * * *